J. A. STEVENSON.
APPARATUS FOR THE MIXTURE IN PREDETERMINED PROPORTIONS OF TWO DIVERSE FERMENTABLE OR OTHER SUBSTANCES.
APPLICATION FILED FEB. 27, 1912.
1,071,530.  Patented Aug. 26, 1913.
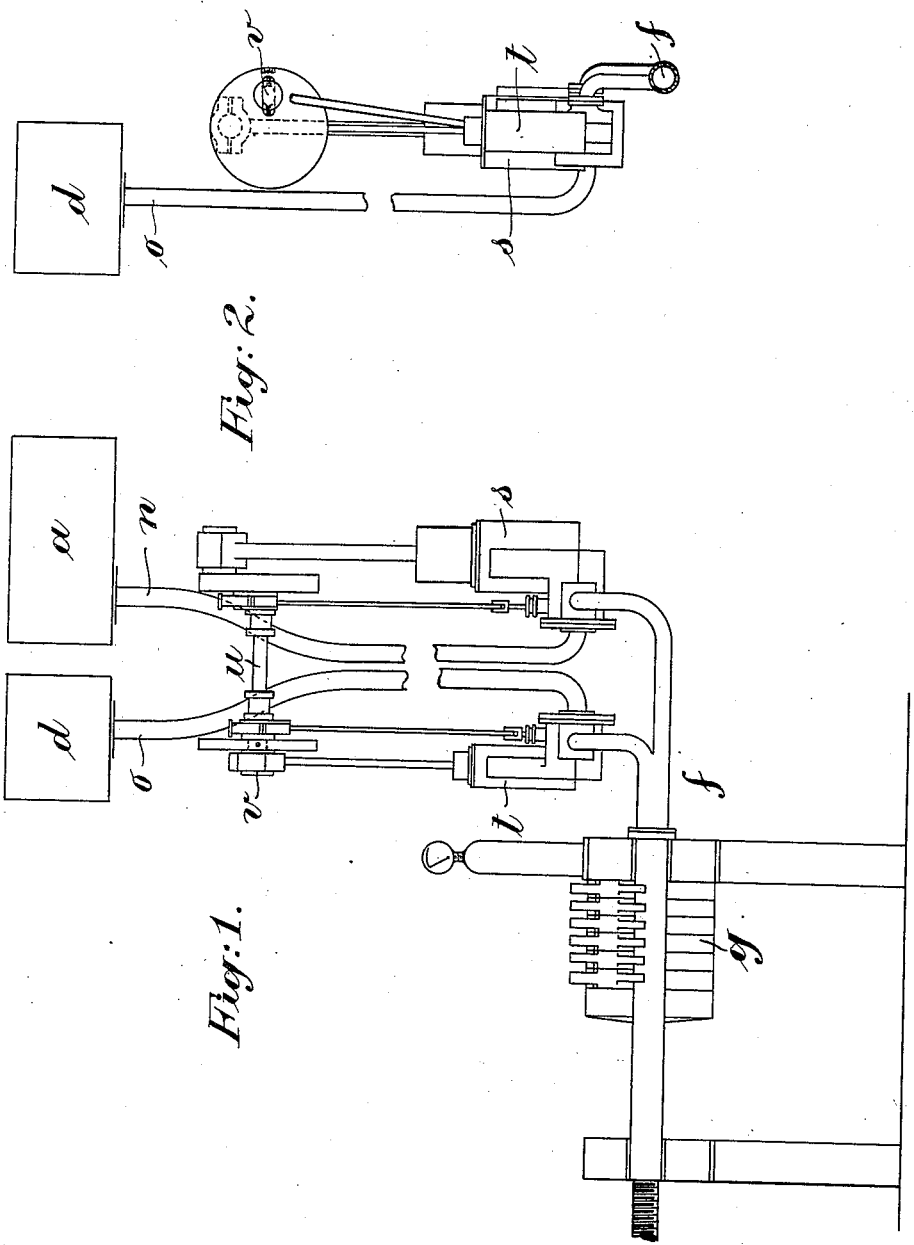

UNITED STATES PATENT OFFICE.

JOHN ATHERTON STEVENSON, OF ACTON, ENGLAND.

APPARATUS FOR THE MIXTURE IN PREDETERMINED PROPORTIONS OF TWO DIVERSE FERMENTABLE OR OTHER SUBSTANCES.

1,071,530.                      Specification of Letters Patent.      Patented Aug. 26, 1913.

Application filed February 27, 1912. Serial No. 680,252.

*To all whom it may concern:*

Be it known that I, JOHN ATHERTON STEVENSON, subject of the King of Great Britain and Ireland, residing at 6 Malvern Villas, Acton, W., in the county of Middlesex, England, have invented new and useful Improvements in Apparatus for the Mixture in Predetermined Proportions of Two Diverse Fermentable or other Substances, of which the following is a specification.

This invention relates to mixing apparatus for the treatment of fermentable substances, viz:—yeasts of all descriptions or other materials and has for its object the mixing or treatment of such substances in a fluid condition in order to incorporate at once with the fermentable or other substances any accelerating agent, such for instance as sugar, malt extract with a small percentage of distillers yeast mixed with it and the like, which latter increases the fermentability of the mixture, when the fermentation is to ultimately take place, after the mixture has been put on the market, but which during the time between incorporation and the time of designed ultimate fermentation no operative effect of the accelerating agent can take place.

My invention consists in placing separately the fermentable substance and the accelerating agent, and delivering them by their gravity, in a proportionate amount, to two motors connected together operated by the said pressure of the two substances so that the proportionate quantities of either substance is directly measured by the capacity of each motor, which motors deliver the said mixture into a compressing device adapted to get rid of all the liquid from the compressed substance after the proper compression has taken place. A final dry product may thus be produced which will contain latent fermentability to a high extent which is capable of being brought into action under heat and moisture.

I may use hydrostatic pressure obtained by heightened sources of supply consisting of two elevated tanks, each containing separately the two liquid substances. In this case each substance would be under a constant head and would supply power by which the two motors, directly connected with each other would be caused to operate, the capacity of each motor being so proportioned that by their mutual operation they become absolute measurers of the relative substances displaced, afterward being used to deliver the mixed product to a common pipe leading to the compression device.

In order that the invention may be the better understood I will now proceed to describe the same in relation to the accompanying drawings reference being had to the letters and figures marked thereon.

Like letters refer to similar parts in each of the figures.

Figure 1 is a view of the apparatus for mixing two materials. Fig. 2 is a side elevation of the two motors.

In Fig. 1 the two tanks $a$ and $d$ are shown for separately containing the two diverse substances which it is desired to mix. Two pipes $n$ and $o$ lead down from the said tanks and enter the valve boxes of two motors $s$ and $t$. These motors are coupled together for simultaneous operation by the common shaft $u$. One of these motors has its motive plunger made smaller than the plunger of the other motor, so that by the mutual reciprocation of the plungers of these motors a proportion between the two substances that are to be mixed is formed. But in order to vary the proportionate delivery of one motor $t$ as compared with the other, the crank pin $v$ is adapted to be adjusted radially so as to vary the stroke of the plunger of this motor.

The motors are set at right angles to the same mutual shaft $u$ so that they will be operated together by the hydrostatic pressure of the two liquid substances from the tanks $a$ and $d$ which deliver their contents by the two pipes $o$ and $n$ to the motors which will deliver the products by the pipes $c$ and $d$ to the single pipe $f$ by which the mixture is delivered to the filter press $g$. The mixture is here subjected to pressure by which the liquid in it is removed and the material of the mixture may be taken out of the press ready for market.

It is obvious that I may provide an extra pressure upon the tanks by closing them entirely, and a gaseous pressure may be set up in each tank so as to force the liquid therefrom.

Having now fully described my invention I claim as new and desire to secure by Letters Patent:—

1. Apparatus consisting of the combination of two fixed motors of different capacity, each of said motors comprising a cylinder and a plunger adapted to reciprocate therein, two separate tanks of liquid supply positioned at a considerable height with respect to said motors to provide a hydrostatic head therefor and a shaft connecting and simultaneously reciprocating said plungers so that their mutual travel forms a direct measure of the quantity of substances passed by them.

2. Apparatus consisting of the combination of two fixed motors of different capacity, each of said motors comprising a cylinder and a plunger adapted to reciprocate therein, two separate tanks of liquid supply positioned at a considerable height with respect to said motors to provide a hydrostatic head therefor, pipes from the said sources of supply to the said motors, and delivery pipes from the said motors joined together to carry off the mixed product, and a shaft connecting and simultaneously reciprocating said plungers so that their mutual travel forms a direct measure of the quantity of substances passed by them.

3. Apparatus consisting of the combination of two fixed motors of different capacity, each of said motors comprising a cylinder and a plunger adapted to reciprocate therein, two separate tanks of liquid supply positioned at a considerable height with respect to said motors to provide a hydrostatic head therefor, pipes from the said tanks to the said motors, a shaft connected to and simultaneously reciprocating the said plungers so that their mutual travel forms a direct measure of the quantity of substances passed by them, an adjustable device for regulating the stroke of one of the said plungers as compared with the other and delivery pipes from the said motors joined together to carry off the mixed product.

In testimony whereof I have signed my name to this specification in the presence of two subscribing witnesses.

JOHN ATHERTON STEVENSON.

Witnesses:
JOHN C. FELL,
CHARLES J. R. BULLOUGH.

---

Copies of this patent may be obtained for five cents each, by addressing the "Commissioner of Patents, Washington, D. C."